UNITED STATES PATENT OFFICE.

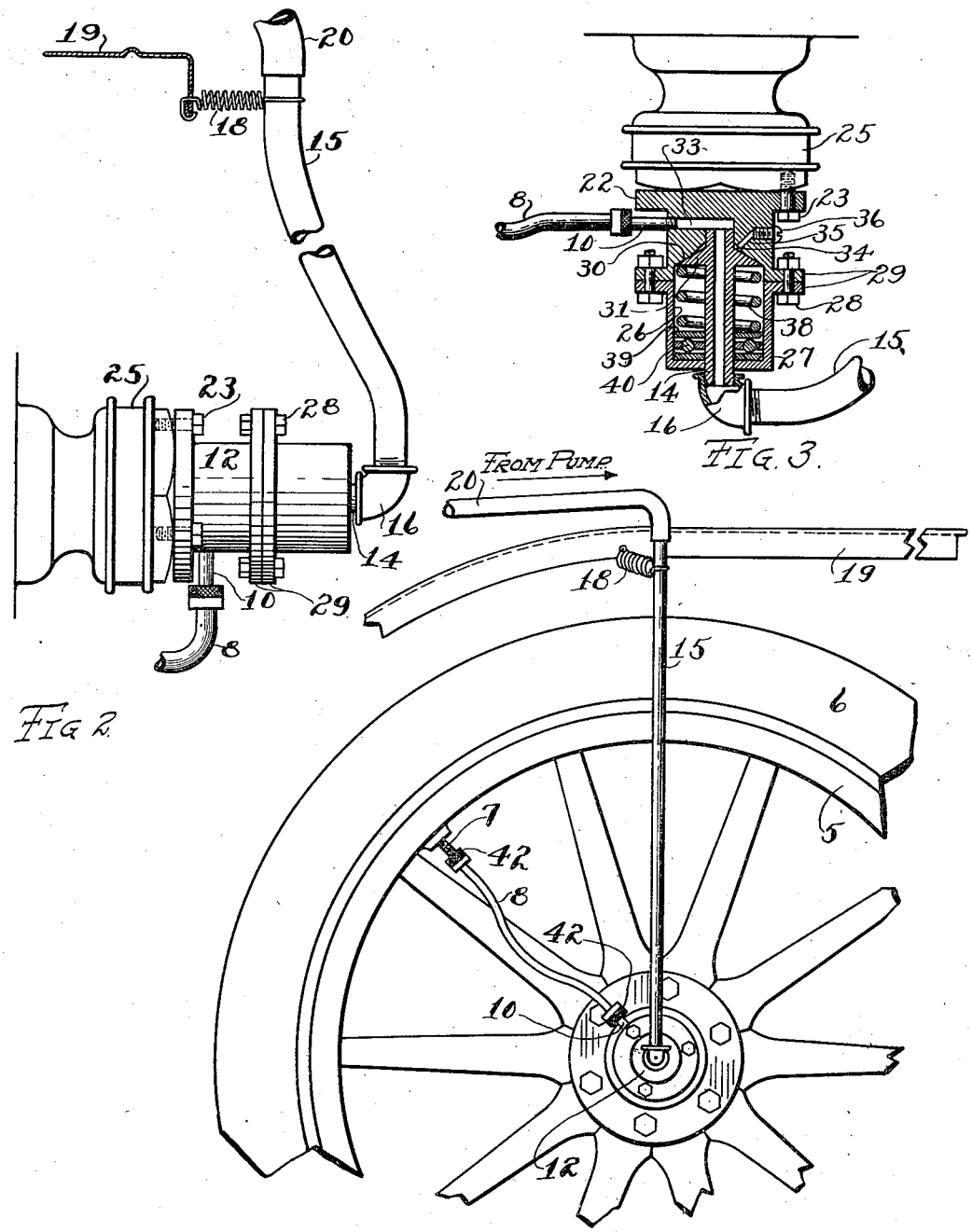

TAVER BAYLY, OF CLEARWATER, FLORIDA, ASSIGNOR OF ONE-HALF TO DONALD ALVORD, OF CLEARWATER, FLORIDA.

TIRE-INFLATING DEVICE.

1,165,057. Specification of Letters Patent. Patented Dec. 21, 1915.

Application filed July 3, 1915. Serial No. 37,303.

*To all whom it may concern:*

Be it known that I, TAVER BAYLY, a citizen of the United States, residing at Clearwater, in the county of Pinellas and State of Florida, have invented a certain new and useful Improvement in Tire-Inflating Devices, of which the following is a full, clear, and exact description, reference being had to the accompanying drawings.
The general object of this invention is to provide a simple and efficient device for enabling the inflation of pneumatic tires of a vehicle while the vehicle is in motion.

My invention is particularly adapted for use with automobiles and is very useful when a tire is leaking comparatively slowly, as for example when it has been punctured by a sharp object such as a nail, a thorn or the like, and which would ordinarily necessitate repair before proceeding.

With my device the tire may be maintained in an inflated condition while the vehicle is in motion by pumping air into the tire faster than the leak allows air to escape, thereby permitting the driver to continue his journey until a propitious time for repairing the leak.

My invention comprises a tubular connection adapted to conduct air continuously from the usual automatic pump on the automobile to any tire which may be leaking, notwithstanding the revolution of the wheel, and includes a tubular swivel connection so arranged that it may be mounted substantially at the axis of the wheel and has two relatively rotatable members, one of which is adapted to connect with a tube leading from the pump and the other with a tube leading to the tire.
A more specific object of my invention is to so arrange the device that it may be compact and easily stored in a small space and be capable of convenient attachment to automobiles of the usual construction.
Other objects of my invention are hereinafter more fully described in connection with the accompanying drawings and the essential characteristics are summarized in the claims.
In the drawings Figure 1 is a side elevation of a wheel showing my invention mounted in position and operatively connected therewith; Fig. 2 is a side elevation on an enlarged scale showing the rotatable connection for the tubes; Fig. 3 is an axial section through the rotatable connecting device on the same scale as Fig. 2.

Referring to the drawings by reference numerals 5 indicates an automobile wheel provided with a pneumatic tire 6 which may be inflated through a valve stem 7. Leading to the valve stem is a flexible tube 8 connected at its other end with a nipple 10 communicating with a rotatable casing 12 adapted to be secured to the wheel so that it may rotate about its own axis. Extending outwardly from the casing is a tubular member 14, to which a metal tube 15 is rigidly secured, preferably by means of an L fitting 16. The metal tube 15 preferably extends radially past the wheel and may be secured against rotation in any desirable manner, for example, I have shown a spring 18 secured at one end to the usual mud guard 19 and having its other end attached to the tube 15. At its outer end the tube 15 is preferably connected with a flexible tube 20 leading from the air pump which is usually adapted to be driven by the engine.

The casing 12 is preferably provided with a flange 22 through which may extend bolts or cap screws 23 adapted to engage threaded openings in the usual hub cap 25 of the vehicle wheel. This casing is provided with a cylindrical bore 26 shown as formed partly in a cap member 27 secured to the base portion of the casing by bolts 28 passing through flanges 29. At the inner end of the bore the casing is provided with a conoidal bearing surface 30 which fits a flange 31 rigid with the tube member 14 which extends outside the casing, as heretofore described. This tube member communicates at its inner end with the passage 33 which is threaded to receive the nipple 10 connected with the flexible tube 8. At the smaller portion of the conoidal surface 30 is a chamfered portion providing an annular space 34 for lubricant, led to the space through a passage 35 through which the lubricant may be forced by a screw 36 closing the outer end of the same. The flange 31 is pressed against its bearing by a compression spring 38 which bears at its other end against a rotatable collar 39 resting against ball bearings 40 to receive the end thrust of the spring.

It will be seen from the construction described that when the metal tube 15 is prevented from revolving the tube 14 is prevented from rotating, and the rotation of the wheel will cause the casing 12 to rotate, but the air-tight connection maintained at the surface 30 prevents the leakage of the air at this point notwithstanding such rotation. Consequently the air which is forced through the tube 15 and through the tube 14 will be directed through the passage 33, nipple 10, flexible tube 8, to the valve stem 7, and into the tire.

When the tire is punctured it is only necessary to secure the casing 12 to the hub cap of that wheel, the cap having been previously threaded to receive the screws 23. The flexible tube 8 which is preferably provided with an internally threaded collar 42 at each end, is then connected to the nipple 10 and the valve stem 7, the spring 18 is hooked to any solid member adjacent the wheel, as for example the mud guard, by means of the spring 18, as described, and the flexible tube 20 leading from the pump is then secured to the end of the tube 15 and the pump started. The pump may be run continuously or intermittently, it being only necessary to supply sufficient air to the tire to compensate for the loss by the leak, and thereby maintain the desired pressure until a suitable opportunity for repair may arrive.

The spring 18 permits the usual vertical movement of the wheel relative to the mud guard or other stationary part while still preventing any material revolving movement of the tube 15. While I have shown the casing 12 as secured to the hub cap by screws 23, it is obvious that this may be accomplished in any other convenient manner.

Having thus described my invention, what I claim is:

1. In a device of the character described, the combination of a wheel having a pneumatic tire, a casing carried at the axis of the wheel and having a passage, a tubular connection communicating with the passage and leading to the pneumatic tire, a tubular member carried axially of the wheel and extending into the casing, coöperating shoulders on the casing and tubular member, means for preventing the rotation of the tubular member, means connected with a source of supply for conveying fluid to the tubular member, a collar within the casing surrounding the tubular member, and a spring between said collar and the shoulder on the tubular member adapted to press said shoulders together.

2. In a device of the character described, the combination with a wheel having a pneumatic tire, of a casing mounted at the axis of the wheel and having a passage, a tubular passage leading from said passage to the tire, a tubular member extending into the casing, coöperating shoulders on the casing and tubular member, a collar surrounding the tubular member, and a spring between the collar and the shoulder on the tubular member, adapted to press said shoulders together.

3. In a device of the character described, the combination of a wheel having a pneumatic tire, a casing carried at the axis of the wheel, a connection leading from the tire to the casing, a passage within the casing communicating with the connection, a tubular member within the casing and communicating with said passage and extending outside the casing, a tube connected with the tubular member outside the casing, means for holding the tube and tubular member substantially stationary, coöperating shoulders on the casing and the tubular member, a collar surrounding the tubular member within the casing, a spring for pressing the shoulders together mounted between the shoulders on the tubular member and said collar, and a ball bearing between said collar and the casing.

4. The combination, with a wheel having a hub and a pneumatic tire, of a casing secured to said hub having its interior in communication with the tire, a stationary tubular member having a projecting head within the casing, a ball bearing within the casing, a spring surrounding said tubular member and compressed between said ball bearing and said head, and means for conveying air under pressure to said tubular member.

5. In a device of the character described, the combination, with a wheel having a pneumatic tire, of a connection leading to the tire from the axis of the wheel, a casing at the axis of the wheel communicating with said connection, a tubular member carried by the casing, coöperating shoulders on the casing and tubular member, a compression spring surrounding the tubular member, and a rolling bearing member for receiving the thrust of the spring at one end, said spring engaging the shoulder on the tubular member at its other end.

In testimony whereof, I hereunto affix my signature.

TAVER BAYLY.